May 19, 1959     J. W. BAYMILLER ET AL     2,887,428
ASBESTOS-CONTAINING VIBRATION DAMPING SHEET MATERIAL
Filed April 5, 1957
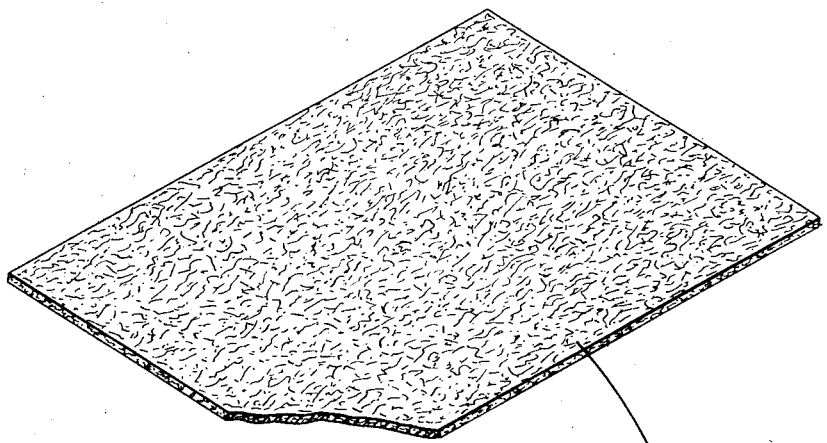
FIBROUS SHEET COMPRISING
FELTED FIBERS OF:
   (1) ASBESTOS
   (2) FIBROUS TALC
   (3) RAG FURNISH
THE FIBERS COATED WITH
   (1) ASPHALT
   (2) SYNTHETIC RUBBER
INVENTOR
JOHN W. BAYMILLER
PAUL E. MERRIFIELD
ATTORNEY

United States Patent Office 2,887,428
Patented May 19, 1959

2,887,428

ASBESTOS-CONTAINING VIBRATION DAMPING SHEET MATERIAL

John W. Baymiller, Manheim Township, Lancaster County, and Paul E. Merrifield, Manor Township, Lancaster County, Pa., assignors to Armstrong Cork Company, Lancaster, Pa., a corporation of Pennsylvania Application April 5, 1957, Serial No. 650,810

6 Claims. (Cl. 162—145)

This invention relates generally to a felted sheet product and more particularly to a flexible felted sheet product useful as a vibration damping material. Still more particularly, the invention relates to a flexible felted sheet product containing three distinct kinds of fibers having deposited thereon a certain binder material.

Vibration damping felts have long been used to reduce the noise and vibration emanating from equipment in use by the general public. A prime example of such equipment is the automobile. Vibration damping felts are placed just inside the exterior steel body in order that the driver and passengers will not be subjected to the normal noise and vibration attendant upon a driven car. With the advent of lower automobiles and the associated reduction in head room, it has become necessary to make use of every possible inch of space from the automobile floor to the steel roof. It is no longer possible for the steel roof, the vibration damping material, and the head lining material to be spaced so that a dead air space exists between each of those elements. New automobile design calls for actual physical contact between the vibration damping material and the head lining material. Existing vibration damping materials tend to bleed and thus discolor head lining material. Additionally, the vibration damping felt must now be better able to conform to curved surfaces than was formerly necessary. And in addition to these more stringent requirements, the damping rate in decibels per second must still remain substantially what it was before.

It is the primary object of the present invention to supply such a vibration damping felt. It is a further object to supply a nonbleeding flexible vibration damping felt which possesses suitable noise damping rates when installed in equipment such as automobiles, air conditioners, and the like. It is a further object to present a method of making such a vibration damping felt.

These objects are accomplished in a surprisingly effective manner. The invention contemplates a flexible sheet product comprising felted asbestos fibers, rag furnish, and fibrous talc. The fibers have deposited thereon a mixture comprising asphalt and a synthetic rubber. The deposition must be carried out by the beater saturation technic. The asphalt used must meet certain stringent requirements if the product is to have the necessary properties. The characteristics of the asphalt are set forth more fully below.

There is some difference in the vibration damping efficiency, depending upon the grade of asbestos fibers used. The major difference between the various grades of asbestos fibers is the length of the fibers. The classification system used to determine fiber grade is based on a screening process. The following percentages of a given quantity of three types of asbestos fibers would be retained by screens of the sizes shown in the following table.

| Asbestos Fiber Type | Percent of Fiber Retained by Screens— Screen Size | | | |
|---|---|---|---|---|
| | 2 | 4 | 10 | Fines |
| | Percent | Percent | Percent | Percent |
| 6D | 0 | 0 | 43 | 57 |
| 7D | 0 | 0 | 31 | 69 |
| 7R | 0 | 0 | 0 | 100 |

Any of the above types of fibers may be used in the present invention. Generally speaking, however, the 7R grade is too fine to use on commercial Fourdrinier wires. However, this does not prohibit the use of the dust grade asbestos fiber on a small scale, particularly in batch lots. The longer grades of asbestos fibers are generally preferred. Those asbestos fibers which may be processed readily in existing equipment may be utilized. Fibers that are too long may be passed through a beater or a Jordan engine until a readily processible length is achieved.

The asbestos fibers should be blended with rag furnish and with fibrous talc to achieve a suitable vibration damping material.

The rag furnish preferably should be a soft fiber with fast draining characteristics to contribute to the flexibility and formation of the resulting sheet. Washables, which are used rags containing 20% or more by weight of rayon, are a cheap source of fibers with the desired properties; the balance will be cotton. Cotton linters may be used as the rag furnish if desired.

Fibrous talc microscopically is a fiber in that it does have a length dimension distinguishing it from ordinary talc and the usual mineral fillers. This length with respect to cross section results in a relatively fast draining mineral filler. Fibrous talc can be obtained commercially as International Fiber 6N.

It has been found that the asbestos fibers must be present to the extent of at least about 10% by weight of the total fibers present if the final product is to be suitable for the purpose intended. Preferably the asbestos fibers will be present in the range of about 10%–20% by weight of the total fibers. The rag furnish should be present in the range of about 25%–40% by weight of the total fibers and preferably around 35% by weight. The fibrous talc should be present in the range of about 35%–65% by weight and preferably about 50% by weight total fibers. A preferred fiber formulation on a parts by weight basis is: 1 part asbestos, 2 parts rag furnish, and 3 parts fibrous talc.

In accordance with the usual beater saturation technics, the mixture of asbestos and other fibers is taken up in water to form a slurry. The slurry may be of any workable consistency, 2% being preferred for further treatment. After the fibers have been processed through a beater or a Jordan engine or similar device, if needed, the slurry is ready for further treatment with the mixture of asphalt and synthetic rubber.

The asphalt to be used in the present invention will be in the form of an aqueous emulsion. The asphalt emulsion is a stable asphalt emulsion of the oil-in-water type, being sufficiently stable to pass the ASTM D397–39 demulsification test (not more than 30% demulsification by 50 ml. 0.1 N $CaCl_2$), also referred to as the Myers test. Most advantageously, the asphalt emulsion is not more than 2% demulsified by the said Myers test. As stabilizing agents for the emulsion, the proteins are preferred, e.g., casein, blood, soya bean meal, peanut meal, and linseed meal. But soaps; the sodium salt of the alcohol-soluble, gasoline-insoluble pine wood resins described in Hall Patent No. 2,193,026; a caustic alkali solution of a purified lignin product prepared by precipitating spent soda black liquor with carbon dioxide, said product being insoluble in water; dilute mineral acids and nonpolar organic solvents and soluble in dilute alkalies and most polar organic solvents, as described by Plunguian in "Industrial and Engineering Chemistry," volume 32, pages 1399–1400; clay; waste sulfite liquor, etc., may be used instead of proteins. Appropriate emulsification procedures using the above types of emulsifying and/or stabilizing agents may be taken from the patent and general literature; e.g., Watts U.S. Patent No. 2,040,115 (casein), McKesson Patent No. 2,074,731 (blood), McKesson Patent No. 2,170,152 (casein), Cole et al. Patent No. 2,336,468 (soya bean meal), Buckley Patent No. 2,256,866, Kirschbraun Patent No. 1,417,835 (clay), and Watts Patent No. 2,332,542 (waste sulfite liquor). Softer asphalts must be used as contrasted to the hard asphalts, asphalt of 250 to 50 penetration by ASTM D5–25 method being necessary. The preferred emulsions also have 55%–68% residue by the ASTM D244–42 method; asphalt particles of uniformly small size, most advantageously 0.5 to 10 microns diameter; and a softening point in a range of 110°–140° F., and preferably in the range of 120°–130° F. The asphalt emulsion may be a 60% residue asphalt emulsion stabilized with 1% by weight based on finished emulsion of sodium caseinate. The necessary asphalt emulsion may be purchased under the name "Bitusize A."

The synthetic rubber employed in the practice of this invention may be any of a number of synthetic rubbers used in the practice of conventional beater saturation methods. Typical of these synthetic rubbers are the products known as GR–S, which is a copolymer of butadiene and styrene containing about 50% to about 70% butadiene. There may also be used the copolymers of butadiene and acrylonitrile containing about 60% to about 80% butadiene. The polychloroprenes generally known as neoprenes may also be used. If desired, homopolymers of butadiene may be employed, as well as homopolymers and copolymers of butadiene homologues such as isoprene. These materials can be generally designated as synthetic rubbers, and more specifically designated as rubberlike polymers of butadiene, isoprene, and chloroprene, and rubberlike copolymers of butadiene or isoprene with copolymerizable vinyl compounds such as styrene and acrylonitrile. In the practice of the present invention, these synthetic rubbers will be utilized in the form of a latex. These latices normally contain about 25% to about 60% solids. Such latices contain additional compounding ingredients such as stabilizers and the like which are well-known to the art and which form no part of this invention.

The asphalt and the synthetic rubber make up the saturant which is to be precipitated on the fibers in the slurry. The synthetic rubber latex is added directly to the asphalt emulsion to form a well-blended mixture. It is this mixture that is added to the slurry of fibers to form a fast draining slurry of coated fibers. Under such circumstances, the asphalt immediately precipitates out on the total fibers in the slurry; the presence of the abestos fibers brings this about. The synthetic rubber, however, must be treated with a precipitating agent in order to precipitate all of the rubber onto the fibers. The addition of a precipitating agent also serves to clean up the white water and to insure that everything, that is, the last remaining traces of both asphalt and rubber, have precipitated onto the fibers. Any or all of the common precipitating agents will function, as for example, sodium chloride, calcium chloride, alum, alum-acid, acetic acid, and cationic soaps. These precipitating agents will generally be added in the form of a water solution. As is to be expected, the method of precipitation will have an effect on the clumping action of the latex and the resulting drainage rate of the slurry.

The optimum amount of asphalt plus rubber (that is, total saturant) to be deposited on the mixture of fibers will be about 50% by dry weight total saturant based on the total dry weight of the fibers. This amount is optimum from the viewpoint of vibration damping efficiency of the final product as contrasted with the other necessary properties of flexibility, nonstaining, and ease of handling.

The optimum amount of synthetic rubber is about 10% by weight of the total saturant of asphalt plus synthetic rubber on a dry basis. Amounts of the synthetic rubber smaller than this do not give sufficient clumping action to the asphalt emulsion to yield practical drainage rates. Amounts appreciably larger than this cause changes in the desirable vibration damping efficiency of the final product. Generally speaking, 8% to 15% by weight of the total saturant of the rubber defines the practical amount of rubber in the total saturant.

The emulsified mixture of asphalt and synthetic rubber is added to the agitated slurry which has a preferred consistency of about 2%. The asphalt will immediately deposit upon the fibers substantially completely. The precipitating agent solution is then added to complete the precipitation of the saturant mixture onto the fibers. Once the precipitation is complete, the slurry of coated fibers may be diluted to a consistency suitable for forming a sheet on standard sheet-forming equipment. Preferably this consistency will be about 1%. The slurry is then passed to the head box of a Fourdrinier wire or a cylinder machine or the like, and a sheet is formed and dried in the usual manner.

The drawing illustrates the resulting sheet.

The rate of feed to the head box should be controlled so that a felted sheet of the desired caliper is produced. It is known that a doubling of the caliper of a particular material with no change in sheet density will produce approximately a three-fold increase in the vibration damping efficiency. It has now been determined that it is possible to hold the vibration damping efficiency nearly constant by decreasing the caliper and increasing the sheet density proportionately. Because of thickness and weight limitations, it is preferred that the final sheet have a caliper in the range of about 0.025"–0.05". If desired, a sheet having a caliper near the upper limit of this range may be prepared on the paper-making machine and then calendered to reduce the caliper but increase the density, thus preserving the vibration damping efficiency needed.

The following examples illustrate several embodiments of the invention. All parts are by weight unless otherwise stated.

*Example I*

With agitation, 12.5 pounds asbestos fiber (7D), 37.5 pounds fibrous talc (International Fiber 6N), and 25.0 pounds rag furnish (washables) were added to 3750 pounds of water, followed by 15 pounds sodium chloride. A mixture of 30 pounds (dry weight) asphalt emulsion, designated as "Bitusize A," and 7.5 pounds (dry weight) of an emulsion of butadieneacrylonitrile copolymer (Hycar 1561) was separately agitated and then slowly poured into the slurry. After thorough agitation, there was added 1 liter of acetic acid (99.7%) to complete the precipitation.

When the water was clear, the slurry was diluted to 1% consistency and run to the head box of a pilot plant Fourdrinier wire set at sufficient speed to produce a sheet having a caliper of 0.047". The sheet was pressed and dried on the machine in the usual manner.

The product was a flexible sheet that would easily conform to curved surfaces. The asphalt did not bleed from the sheet when placed in contact with automobile head lining material at 300° F. for one hour.

The vibration damping rate of the sheet was 2.30 decibels per second, measured by the thick plate method.

*Example II*

Three pilot plant runs were made as in Example I. All percentages are by weight. The following are the results:

| Run No. | Type Furnish | | | Type Saturant | | Caliper (Inches) | Wt. of Saturant (Lbs./Ft.²) | Net Damping Rate, db/sec. |
|---|---|---|---|---|---|---|---|---|
| | Percent 7D Asbestos | Percent Washables | Percent 6 N Int. Fiber | Percent Bit. A | Percent GR-S #2000 | | | |
| 1 | 16⅔ | 33⅓ | 50 | 45 | 5 | .037 | .057 | 2.26 |
| 2 | 16⅔ | 33⅓ | 50 | 45 | 5 | .050 | .076 | 3.21 |
| 3 | 16⅔ | 33⅓ | 50 | 45 | 5 | .092 | .117 | 5.82 |

A factory run of the same formulation as pilot plant run #1 was made, with the material handling satisfactorily on full size production equipment. The physical properties of the sheet compared favorably with pilot plant produced material.

*Example III*

Two runs were made similar to that described in Example I, save that the following ingredients were used. The parts are by weight.

| Ingredients | Parts | |
|---|---|---|
| Asbestos fiber, 7D | 10 | 10 |
| Rag furnish | 20 | 20 |
| Fibrous talc | 30 | 30 |
| Sodium chloride | 12 | 12 |
| Asphalt emulsion (Bitusize A, dry weight) | 27 | 27 |
| Polychloroprene (Neoprene 735) | 3 | |
| Butadiene-acrylonitrile copolymer (Hycar 1561) | | 3 |
| Acetic acid | 5 | 5 |

Nonbleeding sheets resulted having excellent properties as a vibration damping felt.

We claim:

1. A flexible vibration damping sheet material comprising felted fibers and a saturant therefor, said felted fibers consisting of at least about 10% by weight asbestos fibers, at least about 35% by weight fibrous talc, and at least about 25% by weight rag furnish, said saturant being a water-deposited mixture comprising about 8%–15% by weight synthetic rubber, the balance being asphalt, based on the dry weight of said saturant, said asphalt having an ASTM D5–25 penetration of 250 to 50 and a softening point in the range of 110°–140° F.

2. The product according to claim 1 wherein said asphalt has a softening point in the range of 120°–130° F.

3. The product according to claim 1 wherein said felted fibers consist of about 17% asbestos fibers, about 33% rag furnish, and about 50% fibrous talc.

4. The product according to claim 1 wherein said saturant comprises about 10% by weight of said synthetic rubber and about 90% by weight of said asphalt.

5. The product according to claim 1 wherein said synthetic rubber comprises a butadiene-styrene copolymer.

6. The product according to claim 1 wherein said saturant is deposited on said fibers in an amount of about 50% by weight based on the dry weight of the total fibers.

References Cited in the file of this patent

UNITED STATES PATENTS

| 2,133,694 | Greider et al. | Oct. 18, 1938 |
| 2,239,688 | Peik | Apr. 29, 1941 |